A. E. ELLINWOOD.
ENGRAVING MACHINE TABLES.
No. 190,750. Patented May 15, 1877.
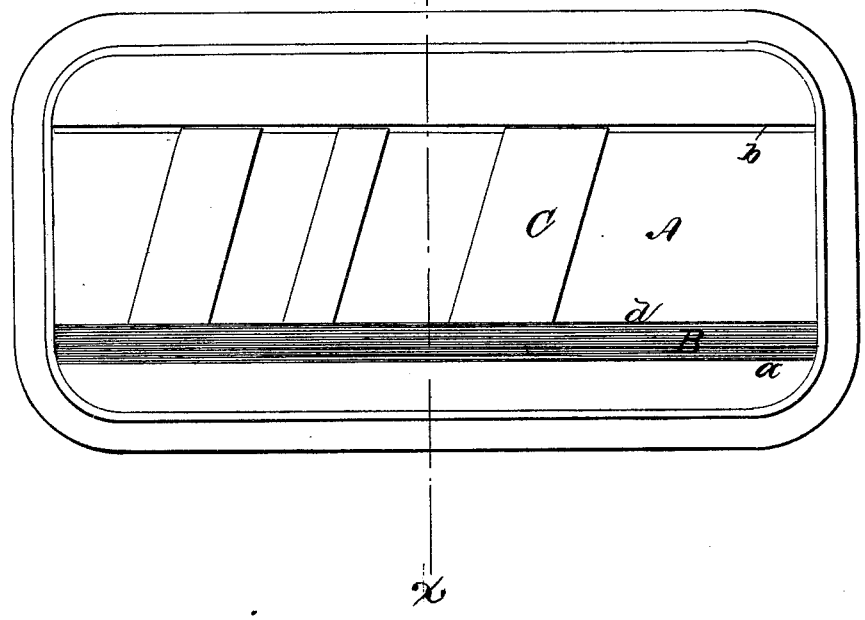
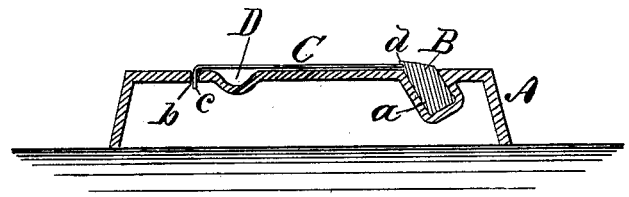
WITNESSES:
INVENTOR:
A. E. Ellinwood.
BY
ATTORNEYS.

UNITED STATES PATENT OFFICE.

AUGUSTUS E. ELLINWOOD, OF GARRETTSVILLE, OHIO.

IMPROVEMENT IN ENGRAVING-MACHINE TABLES.

Specification forming part of Letters Patent No. 190,750, dated May 15, 1877; application filed February 26, 1877.

*To all whom it may concern:*

Be it known that I, AUGUSTUS E. ELLINWOOD, of Garrettsville, in the county of Portage and State of Ohio, have invented a new and Improved Table for Engraving-Machine, of which the following is a specification:

Figure 1 is a plan view. Fig. 2 is a transverse section on line $x\ x$ in Fig. 1.

Similar letters of reference indicate corresponding parts.

The object of my invention is to provide a table for holding the patterns or forms used in engraving-machines by means of an elastic lip, secured in a groove in the table, which receives one of the edges of the pattern, and a longitudinal slot that receives a lip formed on the other edge of the pattern.

In the drawing, A is the table of an engraving-machine, having an inclined longitudinal groove, $a$, near one of its edges, for receiving a rubber strip, B, and a slot, $b$, near the opposite edge, for receiving a lip formed on the end of the pattern C.

D is a shallow groove, formed in the table parallel to and near the slot $b$ for convenience in removing the patterns from the table.

The patterns C are plane engraved pieces of sheet metal, having a lip, $c$, formed on them at right angles.

The upper and inner edge of the strip B projects angularly from the table, forming a lip, $d$. Under this lip the end of the pattern C is placed, and the lip $c$ of the pattern is inserted in the slot $b$. The patterns are, in this manner, quickly secured to the table, and are retained with sufficient pressure to prevent them from being moved by the tracing-point of the engraving-machine.

The advantage claimed for this invention is, that screws and cams are dispensed with, and it is simple, both in construction and operation.

Having thus described my invention, I claim as new and desire to secure by Letters Patent—

A table for an engraving-machine, having the slot $b$, groove $a$, and elastic strip B, for holding the patterns C, substantially as herein shown and described.

AUGUSTUS E. ELLINWOOD.

Witnesses:
   A. A. THAYER,
   W. R. GORE.